US008135221B2

(12) United States Patent
Jiang et al.

(10) Patent No.: US 8,135,221 B2
(45) Date of Patent: Mar. 13, 2012

(54) VIDEO CONCEPT CLASSIFICATION USING AUDIO-VISUAL ATOMS

(75) Inventors: Wei Jiang, New York, NY (US);
 Courtenay Cotton, New York, NY (US);
 Shih-Fu Chang, New York, NY (US);
 Daniel P. Ellis, New York, NY (US);
 Alexander C. Loui, Penfield, NY (US)

(73) Assignees: Eastman Kodak Company, Rochester, NY (US); Columbia University, Rochester, NY (US)

( * ) Notice: Subject to any disclaimer, the term of this patent is extended or adjusted under 35 U.S.C. 154(b) by 338 days.

(21) Appl. No.: 12/574,716

(22) Filed: Oct. 7, 2009

(65) Prior Publication Data

US 2011/0081082 A1 Apr. 7, 2011

(51) Int. Cl.
 *G06K 9/62* (2006.01)
 *G06K 9/54* (2006.01)
(52) U.S. Cl. ............... 382/224; 382/305; 725/37
(58) Field of Classification Search .......... 382/100–325; 725/37–61
 See application file for complete search history.

(56) References Cited

U.S. PATENT DOCUMENTS

| | | | | | |
|---|---|---|---|---|---|
| 6,058,205 | A * | 5/2000 | Bahl et al. | ...... | 382/159 |
| 6,072,542 | A * | 6/2000 | Wilcox et al. | ...... | 348/722 |
| 6,404,925 | B1 * | 6/2002 | Foote et al. | ...... | 382/224 |
| 6,442,538 | B1 * | 8/2002 | Nojima | ...... | 1/1 |
| 6,792,434 | B2 * | 9/2004 | Moghaddam et al. | ...... | 1/1 |
| 6,816,836 | B2 * | 11/2004 | Basu et al. | ...... | 704/270 |
| 7,308,443 | B1 * | 12/2007 | Lee et al. | ...... | 1/1 |
| 7,313,269 | B2 * | 12/2007 | Xie et al. | ...... | 382/159 |
| 7,327,885 | B2 * | 2/2008 | Divakaran et al. | ...... | 382/190 |
| 7,386,806 | B2 * | 6/2008 | Wroblewski | ...... | 715/788 |
| 7,406,409 | B2 * | 7/2008 | Otsuka et al. | ...... | 704/211 |
| 7,676,820 | B2 * | 3/2010 | Snijder et al. | ...... | 725/19 |
| 7,756,338 | B2 * | 7/2010 | Wilson et al. | ...... | 382/190 |
| 2002/0069218 | A1 * | 6/2002 | Sull et al. | ...... | 707/501.1 |
| 2002/0122659 | A1 * | 9/2002 | McGrath et al. | ...... | 386/117 |
| 2002/0157112 | A1 * | 10/2002 | Kuhn | ...... | 725/113 |
| 2005/0238238 | A1 * | 10/2005 | Xu et al. | ...... | 382/224 |
| 2006/0110028 | A1 * | 5/2006 | Liu et al. | ...... | 382/159 |
| 2006/0290699 | A1 * | 12/2006 | Dimtrva et al. | ...... | 345/473 |
| 2007/0033170 | A1 * | 2/2007 | Sull et al. | ...... | 707/3 |

(Continued)

OTHER PUBLICATIONS

J. Anemueller, et al., "Biologically motivated audio-visual cue integration for object categorization," Proc. International Conference on Cognitive Systems, 2008.

(Continued)

*Primary Examiner* — Manav Seth
(74) *Attorney, Agent, or Firm* — Kevin E. Spaulding

(57) ABSTRACT

A method for determining a classification for a video segment, comprising the steps of: breaking the video segment into a plurality of short-term video slices, each including a plurality of video frames and an audio signal; analyzing the video frames for each short-term video slice to form a plurality of region tracks; analyzing each region track to form a visual feature vector and a motion feature vector; analyzing the audio signal for each short-term video slice to determine an audio feature vector; forming a plurality of short-term audio-visual atoms for each short-term video slice by combining the visual feature vector and the motion feature vector for a particular region track with the corresponding audio feature vector; and using a classifier to determine a classification for the video segment responsive to the short-term audio-visual atoms.

12 Claims, 8 Drawing Sheets

U.S. PATENT DOCUMENTS

| | | | |
|---|---|---|---|
| 2007/0038612 A1* | 2/2007 | Sull et al. | 707/3 |
| 2007/0044010 A1* | 2/2007 | Sull et al. | 715/500.1 |
| 2007/0101269 A1* | 5/2007 | Hua et al. | 715/723 |
| 2007/0271256 A1 | 11/2007 | Chang et al. | |
| 2008/0193016 A1* | 8/2008 | Lim et al. | 382/190 |
| 2010/0172591 A1* | 7/2010 | Ishikawa | 382/224 |
| 2011/0093492 A1* | 4/2011 | Sull et al. | 707/769 |

OTHER PUBLICATIONS

S. F. Chang, et al., "Large-scale multimodal semantic concept detection for consumer video," Proc. 9th ACM SIGMM International Workshop on Multimedia Information Retrieval, 2007.

Y. Wu, et al., "Multimodal information fusion for video concept detection," Proc. International Conference Image Processing, pp. 2391-2394, 2004.

K. Iwano, et al., "Audio-visual speech recognition using lip information extracted from side-face images," EURASIP Journal on Audio, Speech, and Music Processing, 2007.

M. Cristani, et al., "Audio-visual event recognition in surveillance video sequences," IEEE Trans. Multimedia, vol. 9, pp. 257-267, 2007.

M. J. Beal, et al., "A graphical model for audiovisual object tracking," IEEE Trans. Pattern Analysis and Machine Intelligence, vol. 25, pp. 828-836, 2003.

Z. Barzelay, et al., "Harmony in motion," Proc. IEEE Conference Computer Vision and Pattern Recognition, pp. 1-8, 2007.

J. Hershey, et al., "Audio-vision: using audio-visual synchrony to locate sounds," Proc. Advances in Neural Information Processing Systems, 1999.

S. Mallat, et al., "Matching pursuits with time-frequency dictionaries" IEEE Trans. Signal Processing, vol. 41, pp. 3397-3415, 1993.

J. Ogle, et al., "Fingerprinting to identify repeated sound events in long-duration personal audio recordings," Proc. Int. Conf. Acoustics, Speech and Signal Processing, pp. I-233-I-236, 2007.

O. Maron, et al., "A framework for multiple-instance learning," Proc. Advances in Neural Information Processing Systems, pp. 570-576, 1998.

Y. Chen, et al., "Image categorization by learning and reasoning with regions," Journal of Machine Learning Research, vol. 5, pp. 913-939, 2004.

C. Yang, et al., "Region-based image annotation using asymmetrical support vector machine-based multiple-instance learning," Proc. IEEE Conference Computer Vision and Pattern Recognition, pp. 2057-2063, 2006.

X. Wang, et al., "Learning Semantic Scene Models by Trajectory Analysis," Proc. European Conference on Computer Vision, pp. 110-123, 2006.

B. Han, et al. "Incremental density approximation and kernel-based bayesian filtering for object tracking," Proc. IEEE Conference Computer Vision and Pattern Recognition, pp. 638-644, 2004.

Y. Deng, et al., "Unsupervised segmentation of color-texture regions in images and video," IEEE Trans. Pattern Analysis and Machine Intelligence, vol. 23, pp. 800-810, 2001.

H. Zhou, et al., "Object tracking using sift features and mean shift," Computer Vision and Image Understanding, vol. 113, pp. 345-352, 2009.

B. D. Lucas, et al. "An iterative image registration technique with an application to stereo vision," Proc. Imaging understanding workshop, pp. 121-130, 1981.

D. Lowe, "Distinctive image features from scale-invariant keypoints," International Journal of Computer Vision, vol. 60, pp. 91-110, 2004.

N. Dalal, et al., "Histograms of oriented gradients for human detection," Proc. IEEE Conference Computer Vision and Pattern Recognition, pp. 886-893, 2005.

J. Friedman, et al., "Additive logistic regression: a statistical view of boosting," Annals of Statistics, vol. 28, pp. 337-407, 2000.

* cited by examiner

400

INPUT: A SET OF FRAMES $I^1, \ldots, I^T$ FROM A SHORT-TERM VIDEO SLICE $v$. REGIONS $r_1^t, \ldots, r_{n_r^t}^t$ FOR EACH FRAME $I^t$. A SET OF $N_p$ POINT TRACKS $p_j^t$, $j = 1, \ldots, N_p$, $t = 1, \ldots, T$.

1. INITIALIZATION: SET $R = \phi$, $N_r = 0$.
2. ITERATION: FOR $t = 1, \ldots, T$
   - SET $U = \phi$.
   - CALCULATE $M_{k,g}^{t|t+1} = \sum_{j=1}^{N_p} I(P_j^t \in r_k^t) I(P_j^{t+1} \in r_g^{t+1})$ FOR EACH PAIR OF REGIONS $r_k^t \in I^t$, $r_g^{t+1} \in I^{t+1}$
   - FOR EACH REGION $r_k^t \in I^t$:
     - IF $M_{k,l^*}^{t|t+1} > H_{low}$ ($l^* = \arg\max_g M_{k,g}^{t|t+1}$), ADD MATCHED REGION PAIR $(r_k^t, r_{l^*}^{t+1})$ TO $U$.
     - IF $M_{k,l}^{t|t+1} > H_{high}$ ($l \neq l^*$), ADD MATCHED REGION PAIR $(r_k^t, r_l^{t+1})$ TO $U$.
   - ITERATION: FOR THE SET OF $m^t$ REGION PAIRS $(r_k^t, r_{g1}^{t+1}), \ldots, (r_k^t, r_{g_{m^t}}^{t+1})$ IN $U$ THAT START WITH REGION $r_k^t$:
     - IF THERE EXIST $m^r$ REGION TRACKS $r_1, \ldots, r_{m^r}$, $r_j \in R$ THAT END WITH $r_k^t$, REPLICATE EACH REGION TRACK $r_j$ BY $m^t$ TIMES, AND EXTEND EACH REGION TRACK REPLICATION BY APPENDING $r_{g1}^{t+1}, \ldots, r_{g_{m^t}}^{t+1}$ TO THE END OF EACH REPLICATION RESPECTIVELY. SET $N_r = N_r + m^t \times m^r$.
     - ELSE, CREATE NEW TRACKS $r_{N_r+1}, \ldots, r_{N_r+m^t}$ STARTING WITH $r_k^t$ AND ENDING WITH EACH $r_{g1}^{t+1}, \ldots, r_{g_{m^t}}^{t+1}$ RESPECTIVELY. SET $N_r = N_r + m^t$.
3. REMOVE REGION TRACKS IN $R$ WITH LENGTHS SHORTER THAN $H_{long}$. OUTPUT THE REMAINING REGION TRACKS IN $R$.

*FIG. 4*

INPUT: TRAINING SET $S = \{(u_1, y_1), ..., (u_n, y_n)\}$. EACH 10-SEC VIDEO SEGMENT $u_i$ IS REPRESENTED BY SEVERAL TYPES OF CODEBOOK-BASED FEATURES LEARNED WITH DIFFERENT COMBINATIONS OF $f_{vis}$, $f_{mt}$, AND $f_{audio}$.

1. INITIALIZATION: SET SAMPLE WEIGHTS $\sigma_i^1 = 1/2n^+$ OR $1/2n^-$ FOR $y_i = 1$ OR $-1$, RESPECTIVELY, WHERE $n^+$ ($n^-$) IS THE NUMBER OF POSITIVE (NEGATIVE) SAMPLES; SET FINAL DECISIONS $H^1(u_i) = 0$, $i = 1, ..., n$.

2. ITERATION: FOR $\tau = 1, ..., \Gamma$
   - GET TRAINING SET $\tilde{S}^\tau$ BY SAMPLING $S$ ACCORDING TO WEIGHTS $\sigma_i^\tau$.
   - TRAIN AN SVM OVER $\tilde{S}^\tau$ BY USING THE k-th TYPE OF FEATURE. GET THE CORRESPONDING $q_k^\tau(u_i) = p_k^\tau(y_i=1|u_i)$, $i = 1, ..., n$.
   - SET $h_k^\tau(u_i) = \frac{1}{2} \text{LOG}\{q_k^\tau(u_i)/(1 - q_k^\tau(u_i))\}$.
   - CHOOSE THE OPTIMAL $h^{\tau,*}(\cdot) = h_k^\tau(\cdot)$ WITH THE MINIMUM ERROR $\in_k^{\tau,*} = \in_k^\tau$, $\in_k^\tau = \sum_{i=1}^n \sigma_i^\tau e^{-y_i(H^\tau(u_i) + h_k^\tau(u_i))}$, $\in_k^\tau < \in_j^\tau$ IF $j \neq k$.
   - UPDATE WEIGHTS: $\sigma_i^{\tau+1} = \sigma_i^\tau e^{-y_i h^{\tau,*}(u_i)}$, $i = 1, ..., n$, and RE-NORMALIZE SO THAT $\sum_{i=1}^n \sigma_i^{\tau+1} = 1$.
   - UPDATE $H^{\tau+1}(u_i) = H^\tau(u_i) + h^{\tau,*}(u_i)$ FOR $i = 1, ..., n$.

*FIG. 8*

VIDEO CONCEPT CLASSIFICATION USING AUDIO-VISUAL ATOMS

CROSS-REFERENCE TO RELATED APPLICATIONS

Reference is made to commonly assigned, co-pending U.S. patent application Ser. No. 12/331,927, entitled "Semantic Event Detection for Digital Content Records," by Loui, et al., and to commonly assigned, co-pending U.S. patent application Ser. No. 12/408,140, entitled: "Semantic Event Detection Using Cross-Domain Knowledge", by Loui, et al., both of which are incorporated herein by reference.

FIELD OF THE INVENTION

This invention pertains to the field of video analysis and more particularly to the automatic classification of video content using classifiers operating on both visual and audio features.

BACKGROUND OF THE INVENTION

The capture and sharing of digital videos has become increasingly popular. As the number of videos that are available for viewing has increased, the development of methods to organize and search collections of videos has become increasingly important. An important technology in support of these goals is the classification of unconstrained videos according to semantic concepts by automatic analysis of video content. These semantic concepts include generic categories, such as scene (e.g., beach, sunset), event (e.g., birthday, wedding), location (e.g., museum, playground) and object (e.g., animal, boat). Unconstrained videos are captured in an unrestricted manner, like those videos taken by consumers and posted on internet sites such as YouTube. This is a difficult problem due to the diverse video content as well as the challenging condition such as uneven lighting, clutter, occlusions, and complicated motions of both objects and camera.

To exploit the power of both visual and audio aspects for video concept detection, multi-modal fusion approaches have attracted much interest. For example, see the article "Biologically motivated audio-visual cue integration for object categorization" by J. Anemueller and et al. (Proc. International Conference on Cognitive Systems, 2008), and the article "Large-scale multimodal semantic concept detection for consumer video" by S. F. Chang, et al. (Proc. 9th ACM SIGMM International Workshop on Multimedia Information Retrieval, 2007). With these approaches, visual features over global images such as color and texture are extracted from image frames, and audio features such as MFCC coefficients are generated from the audio signal in the same time window.

In early fusion methods, such audio and visual raw features are either directly fused by concatenation to train classifiers or used to generate individual kernels which are then added up into a fused kernel for classification. In more recent fusion approaches, concept detectors are first trained over audio and visual features, respectively, and then fused to generate the final detection results. These fusion methods have shown promising results with performance improvements. However, the global visual feature is insufficient to capture the object information, and the disjoint process of extracting audio and visual features limits the ability to generate joint audio-visual patterns that are useful for concept detection.

There are a number of recent works exploring audio-visual analysis for object detection and tracking. In the field of audio-visual speech recognition, visual features obtained by tracking the movement of lips and mouths have been combined with audio features to provide improved speech recognition. (See: K. Iwano, et al., "Audio-visual speech recognition using lip information extracted from side-face images," EURASIP Journal on Audio, Speech, and Music Processing, 2007.)

In the field of audio-visual object detection and tracking, synchronized visual foreground objects and audio background sounds have been used for object detection. (M. Cristani, et al., "Audio-visual event recognition in surveillance video sequences," IEEE Trans. Multimedia, Vol. 9, pp. 257-267, 2007.)

In the article "A graphical model for audiovisual object tracking," published in IEEE Trans. Pattern Analysis and Machine Intelligence (Vol. 25, pp. 828-836, 2003), M. J. Beal, et al., show that by using multiple cameras to capture the object motion, the joint probabilistic model of both audio and visual signals can be used to improve object tracking.

In audio-visual localization, under the assumption that fast moving pixels make big sounds, temporal patterns of significant changes in the audio and visual signals are found and the correlation between such audio and visual temporal patterns is maximized to locate sounding pixels. (For example, see: Z. Barzelay, et al., "Harmony in motion," Proc. IEEE Conference Computer Vision and Pattern Recognition, pp. 1-8, 2007.) Such joint audio-visual object tracking methods have shown interesting results in analyzing videos in a controlled or simple environment where good foreground/background separation can be obtained. However, both object detection and tracking (especially for unconstrained objects) are known to be difficult in generic videos. There usually exist uneven lighting, clutter, occlusions, and complicated motions of both multiple objects and camera. In addition, the basic assumption for tight audio-visual synchronization at the object level may not be valid in practice. Multiple objects may make sounds together in a video without large movements, and sometimes the objects making sounds do not show up in the video.

SUMMARY OF THE INVENTION

The present invention represents a method for determining a classification for a video segment, comprising using a processor to perform the steps of:

a) breaking the video segment into a plurality of short-term video slices, each including a plurality of video frames and an audio signal;

b) analyzing the video frames for each short-term video slice to form a plurality of region tracks, wherein the region tracks provide an indication of the position of identified image regions in a plurality of video frames;

c) analyzing each region track to form a corresponding visual feature vector providing an indication of visual features for the image region, and a motion feature vector providing an indication of inter-frame motion for the image region;

d) analyzing the audio signal for each short-term video slice to determine an audio feature vector providing a characterization of the audio signal;

e) forming a plurality of short-term audio-visual atoms for each short-term video slice by combining the visual feature vector and the motion feature vector for a particular region track with the corresponding audio feature vector; and f) using a classifier to determine a classification for the video segment responsive to the short-term audio-visual atoms.

This invention has the advantage that significant classification performance improvements can be achieved relative to prior art video classification techniques.

It has the further advantage that it generates a short-term atomic representation in which a moderate level of synchronization is enforced between local object tracks and ambient sounds. This provides a balanced choice for characterizing audio-visual correlation compared to the previous audio-visual fusion approaches that use coarsely aligned concatenation of global features.

It has the additional advantage that it does not rely on precise object extraction. Furthermore, less noisy atomic patterns can be found by the short-term tracking characteristics of short-term audio-visual atoms compared with alternative methods using static image frames without temporal tracking.

BRIEF DESCRIPTION OF THE DRAWINGS

FIG. 4 shows pseudo-code for an algorithm for forming short-term region tracks;

FIG. 8 shows pseudo-code for a concept detector construction algorithm.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image and video manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
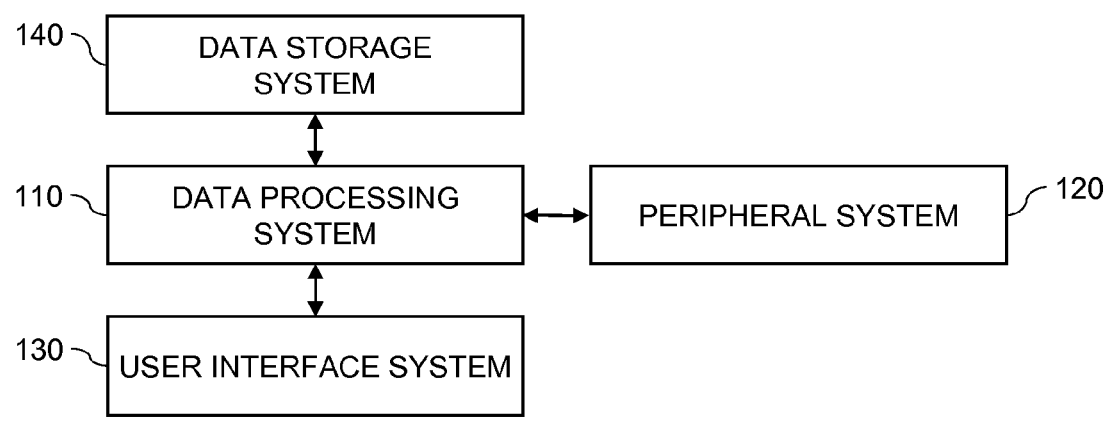
FIG. 1 is a high-level diagram showing the components of a system for classifying digital image according to an embodiment of the present invention.

FIG. 1 is a high-level diagram showing the components of a system for classifying digital videos according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The present invention addresses the challenging issue of audio-visual analysis in generic videos and represents a method for classifying video segments by detecting generic classifications. Classifications are sometimes referred to as "concepts" or "semantic concepts" in the video classification art. These classifications include generic categories, such as scene (e.g., beach, sunset), event (e.g., birthday, wedding), location (e.g., museum, playground) and object (e.g., animal, boat). An important feature of this approach is the formation of short-term audio-visual atoms by extracting atomic representations over short-term video slices (e.g., 1 second). The short-term audio-visual atoms are then used as inputs to a video segment classifier to determine appropriate classifications for the video segments.

Figure 2:
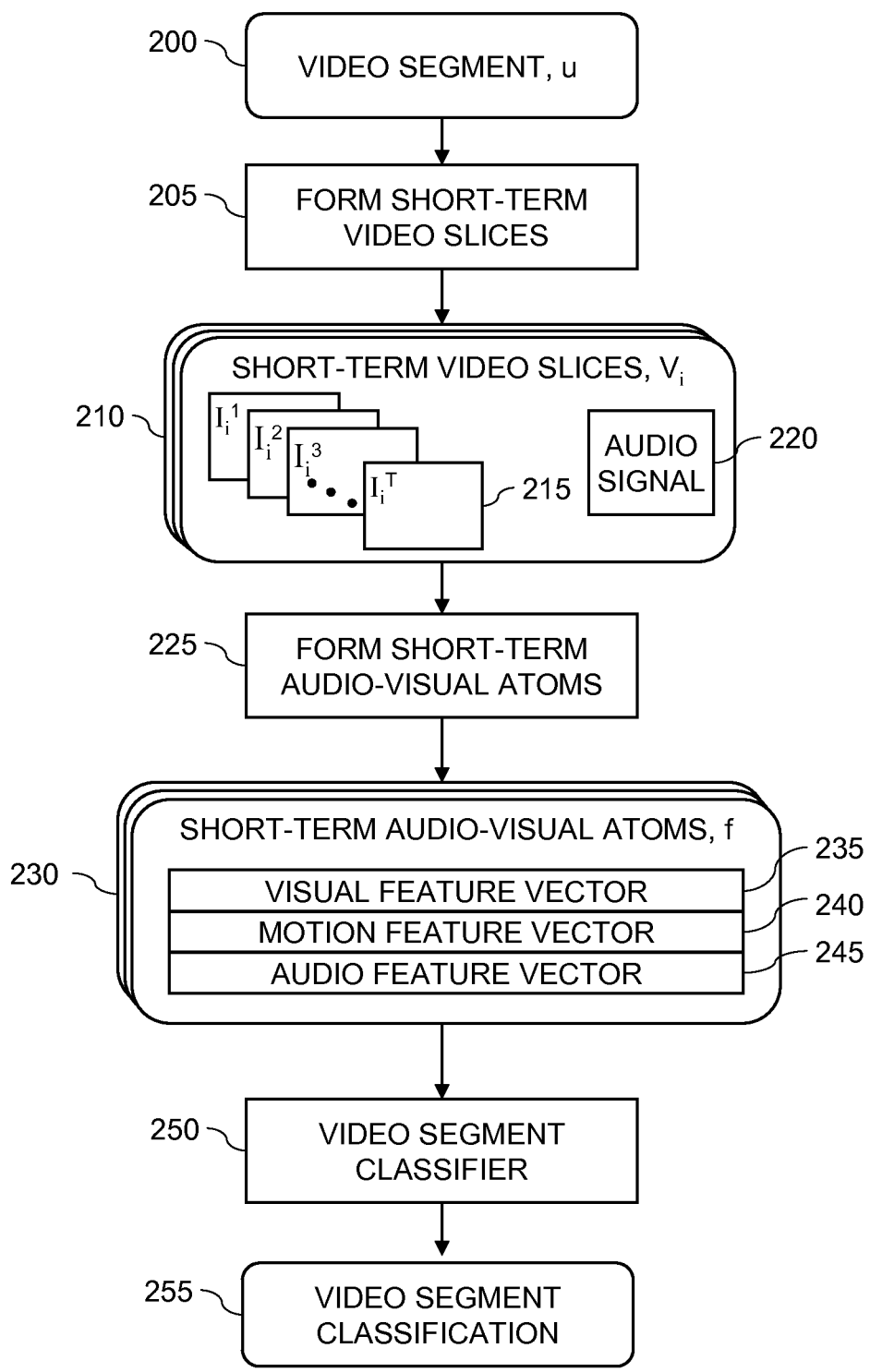
FIG. 2 is flow diagram illustrating a preferred embodiment of the present invention.

A preferred embodiment of the invention will now be discussed with reference to FIG. 2. The input to the process is a video segment (u) 200, which contains a video signal corresponding to some time interval (e.g., 10 seconds). A form short-term video slices step 205 is used to break the video segment 200 into a plurality of short-term video slices ($v_i$) 210, where i is an index indicating the slice number. Each short-term video slice 210 corresponds to a specified time interval (e.g., 1 second). Typically, the specified time interval will be less than or equal to 10 seconds. Each short-term video slice 210 is comprised of a set of video frames ($I^n$) 215, where n is an index indicating the frame number. The value of n will range from 1 to T, where T is the number of video frames in the short-term video slice 210. The video frames 215 are sampled from the video segment 200 at specified time intervals (e.g., 0.1 seconds). The short-term video slice 210 also includes an audio signal 220.

A form short-term audio-visual atoms step forms a plurality of short-term audio-visual atoms (f) 230 for each short-term video slice 210. Each short-term audio-visual atom 230 represents a combination of a visual feature vector 235, a motion feature vector 240 and an audio feature vector 245. The visual feature vector 235 and the motion feature vector 240 for a particular short-term audio-visual atom 230 are determined for an identified image region that occurs in a plurality of the video frames 215. The visual feature vector 235 provides an indication of visual features for the image region, such as color and texture. The motion feature vector 240 provides an indication of inter-frame motion for the image region. The audio feature vector 245 provides a characterization of the audio signal. In the preferred embodiment of the present invention, the audio feature vector 245 represents a decomposition of the audio signal 220 into a time-frequency representation.

Next, a video segment classifier 250 is applied to determine a video segment classification 255. In the preferred embodiment of the present invention, the video segment classifier 250 is a Support Vector Machine (SVM) classifier, and is trained by determining short-term audio-visual atoms for a training set of video segments, where video segments in the training set have known classifications.

In the preferred embodiment of the present invention, the video segment classifier 250 includes the step of constructing discriminative audio-visual codebooks using Multiple Instance Learning (MIL) to capture representative joint audio-visual patterns that are salient for detecting individual concepts. More information about MIL can be found in the article "A framework for multiple-instance learning" by O. Maron, et al. (Proc. Advances in Neural Information Processing Systems, pp. 570-576, 1998), which is incorporated herein by reference.

Figure 3:
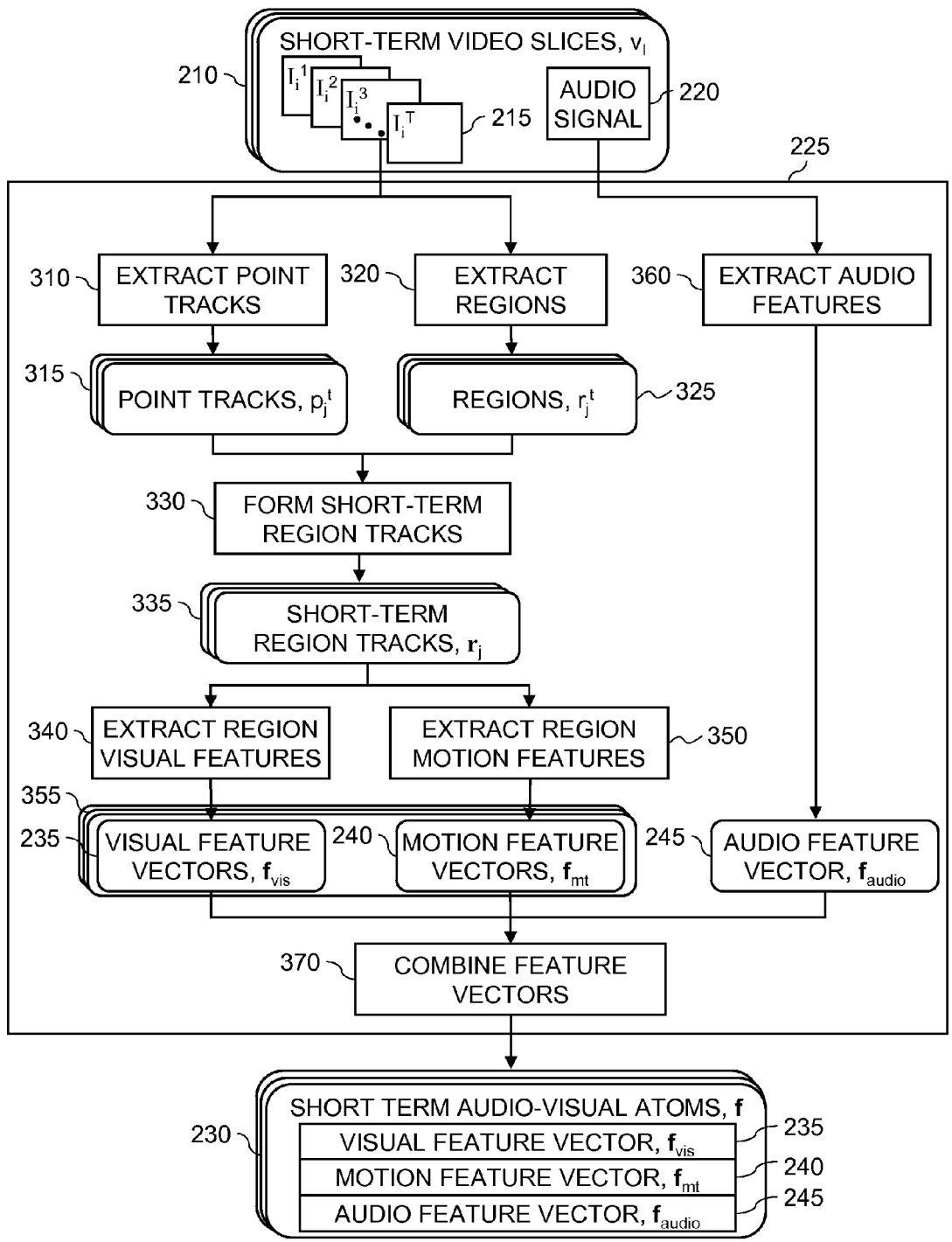
FIG. 3 is a flow diagram showing additional details for the form short term audio-visual atoms step shown in FIG. 2.

Additional details of a preferred method for implementing the form short-term audio-visual atoms step 225 will now be described with reference to FIG. 3. First, the visual aspects of the short-term audio-visual atoms will be considered. An algorithm named Short-Term Region tracking with joint Point Tracking and Region Segmentation (STR-PTRS) is used to extract short-term visual atoms 355 from generic videos. The short-term visual atoms 355 include a visual feature vector 235 and a motion feature vector 240.

STR-PTRS accommodates the challenging conditions in generic videos by conducting tracking within short-term video slices 210 (e.g., 1 second). An extract point tracks step 310 is used to determine a set of point tracks 315 describing the motion of interest points within the short-term video slices. An extract regions step 320 is used to obtain meaningful regions 325 by employing image segmentation based on the color and texture appearance. The point tracks 315 and the regions 325 are combined using a form short-term region tracks step 330 to form short-term region tracks 335. The short-term region tracks 335 are not restricted to foreground objects. They can be foreground objects or backgrounds, or combinations of both, all of which carry useful information for detecting various concepts. For example, the red carpet alone or together with the background wedding music can be useful for classifying a video segment as belonging to the "wedding" concept classification.

With temporal tracking in short-term video slices, better visual atomic patterns can be found compared to the static-region-based alternatives where no temporal tracking is involved. Tracking of robust regions can reduce the influence of noisy regions. Such noise usually comes from imperfect segmentation, e.g., over segmentation or wrong segments due to sudden changes of motion or illumination. By finding trackable short-term regions and using such short-term region tracks 335 as whole units to form the short-term visual atoms 355, the influence of erroneous segments from a few frames can be alleviated through averaging across good segments as majorities.

Other methods for detecting and tracking unconstrained objects in generic videos are known in the art and can also be used in accordance the present invention. Examples of other tracking algorithms, blob-based trackers (for example, see X. Wang, et al., "Learning Semantic Scene Models by Trajectory Analysis," Proc. European Conference on Computer Vision, pp. 110-123, 2006) and model-based trackers (for example, see B. Han, et al. "Incremental density approximation and kernel-based Bayesian filtering for object tracking," Proc. IEEE Conference Computer Vision and Pattern Recognition, pp. 638-644, 2004). Blob-based approaches rely on silhouettes derived from variants of background subtraction methods. Most model-based algorithms rely on manual initialization, which is generally not available for automatic semantic classification problems. Object detectors can be used to initialize a tracking process but are restricted to tracking some specific objects like human body or vehicle, since it is unrealistic to train a detector for any arbitrary object. Generally, STR-PTRS algorithm will be more robust that these algorithms to factors such as clutter, occlusions, change of shape and angle, and camera/object motion.

Once the short-term region tracks 335 have been formed, an extract region visual features step 340 is used to extract visual feature vectors 235. The visual feature vectors 235 characterize visual features of a region track. Examples of visual features that can be included in the visual feature vectors include color moments, texture feature descriptors and edge direction histograms.

Similarly, an extract region motion features step 350 is used to extract motion feature vectors 240. The motion feature vectors 240 characterize the inter-frame motion of the region track during the time interval of the short-term video slice 210. For example, the motion feature vectors can include a representation of the speed and direction of motion for the region track An extract audio features step 360 is used to form an audio feature vector 245 by analyzing the audio signal 220 for a short-term video slice 210. The audio feature vector 245 is comprised of a set of audio descriptors which are used to characterize the audio signal 220. In the preferred embodiment of the present invention, audio descriptors are based on a Matching Pursuit (MP) representation of the audio data described by S. Mallat, et al. in the article "Matching pursuits with time-frequency dictionaries" (IEEE Trans. Signal Processing, Vol. 41, pp. 3397-3415, 1993), which is incorporated herein by reference.

The algorithm for forming an MP representation of the audio data involves using sparse signal decomposition from an over-complete set of basis functions. MP basis functions correspond to concentrated bursts of energy localized in time and frequency and span a range of time-frequency tradeoffs, enabling an audio signal to be described with the basis functions that most efficiently explain its structure. The sparseness of the representation makes this approach robust to background noise, since a particular element will remain largely unchanged even as the surrounding noise level increases. J. Ogle, et al. have explored using this approach for a robust audio fingerprinting application as described in the article "Fingerprinting to identify repeated sound events in long-duration personal audio recordings" (Proc. Int. Conf. Acoustics, Speech and Signal Processing, pp. 1-233-236, 2007).

The composition of an MP representation should allow discrimination among the various types of structured (e.g. speech and music) and unstructured audio elements that are relevant to concept detection. An audio feature vector 245 is extracted from the audio signal 220 for each short-term video slice 210. The audio signal 220 is decomposed into its most prominent elements, and described as a histogram of the parameters of the basis functions. The mean energy in each frequency band is also determined and stored as a sub-band energy spectrum.

A combine feature vectors step 370 is used to form short-term audio-visual atoms 230 from the visual feature vectors 235, the motion feature vectors 240 and the audio feature vectors 245. This is done by concatenating a visual feature vector 235 and a motion feature vector 240 for a particular short-term region track 335 with a corresponding audio feature vector 245. Since a plurality of short-term region tracks 335 will typically be determined for a particular short-term video slice 210, there will be a corresponding plurality of short-term audio-visual atoms 230 that are produced for each short-term video slice 210.

The Short-Term Region tracking with joint Point Tracking and Region Segmentation (STR-PTRS) algorithm for extracting short-term visual atoms 355 will now be described in more detail. Tracking is generally conducted within short-term video slices (e.g., 1 second) so that the changes and movements of the camera and objects are relatively small and there is a high likelihood of finding consistent parts in the frames that can be tracked well. In the preferred embodiment of the present invention, an image segmentation algorithm that relies on the static color and texture appearance is used to obtain meaningful regions from a video slice. This approach has an advantage relative to background subtraction or spatial-temporal segmentation methods that rely on motion. This is because it is very hard to separate camera motion from object motion in generic videos, and often the overall motion is very unstable. In addition, for semantic concept detection, not only foreground objects but also backgrounds have been found to be useful.

Within each short-term video slice, interest point tracking and region segments are used to obtain short-term region tracks. Robust points that can be locked-on well are tracked through the short-term video slice, and based on point linking trajectories, image regions from adjacent frames are connected to generate region tracks. Compared to other possible alternatives, e.g., connecting regions with the similarity over the color and texture appearance directly, this approach has been found to be more effective in both speed and accuracy.

Let v denote a video segment 200 that is partitioned into m consecutive short-term video slices 210 ($v_1, v_2, \ldots v_m$), where each short-term video slice 210 ($v_i$) has a designated length (e.g., 1-sec). A set of video frames 215 ($I_i^1, I_i^2, \ldots I_i^T$) are uniformly sampled from each short-term video slice 210 with a relatively high frequency (e.g., one for every 0.1 second).

In the preferred embodiment of the present invention, image feature points (e.g., corners) that can be easily locked-on are automatically identified using a method such as that taught by Y. Deng, et al. in the article "Unsupervised segmentation of color-texture regions in images and video" (IEEE Trans. Pattern Analysis and Machine Intelligence, Vol. 23, pp. 800-810, 2001). The feature points are then tracked using a method such as the well-known Kanade-Lucas-Tomasi Tracker (KLT Tracker). The result is a set of $N_p$ point tracks 315, where each point tracks 315 has a trajectory $p_j^t=(x1_j^1, x2_j^t)$, where $t=1, \ldots, T$ is the temporal index (in the unit of frames), $j=1, \ldots, N_p$ is the index of point tracks 315, and x1, x2 are the image coordinates. In the preferred embodiment, the KLT tracker is initialized with 3000 initial points.

The KLT tracker has the desirable characteristic that it provides a good balance of reliability and speed. The KLT tracker defines a measure of dissimilarity that quantifies the change of appearance of a feature between the first and the current image frame, allowing for affine image changes. At the same time, a pure translation model of motion is used to track the selected best features through the sequence. In addition, the maximum inter-frame displacement is limited to improve the reliability and the processing speed. Alternative tracking methods can also be used in accordance with the present invention such as tracking with SIFT-based registration (for example, see H. Zhou, et al., "Object tracking using sift features and mean shift," Computer Vision and Image Understanding, Vol. 113, pp. 345-352, 2009). However, many such methods are disadvantaged in dealing with a large number of video segments due to the speed considerations.

In the extract regions step 320, each frame $I^t$ is segmented into a set of $n_r^t$ homogeneous color-texture regions 325 ($r_k^t$). In the preferred embodiment of the present invention, this is done using the JSeg algorithm described in the aforementioned article by Y. Deng, et al. entitled "Unsupervised segmentation of color-texture regions in images and video."

Next, the form short-term region tracks step 330 is used to generate a set of $N_r$ short-term region tracks 335 ($r_j$), for each short-term video slice 210 ($v_i$). In the preferred embodiment of the present invention, this is accomplished using a region track algorithm 400 described in FIG. 4. In this region track algorithm 400, $I(\cdot)$ is the indicator function. It has been empirically determined that setting $H_{long}=T-2$, $H_{low}=10$, and $$H_{high} = \frac{1}{2} M_{k,1^*}^{t|t+1}$$

generally provides good performance. Each short-term region track 335 ($r_j$) formed using this algorithm contains a set of regions $\{r_j^t\}$ for a sequence of video frames 215, where $t=1, \ldots, T$ is the temporal index (in the unit of frames). The general idea is that if two regions from the adjacent frames share many point tracking trajectories, these two regions are considered as matched regions.

Figure 5:
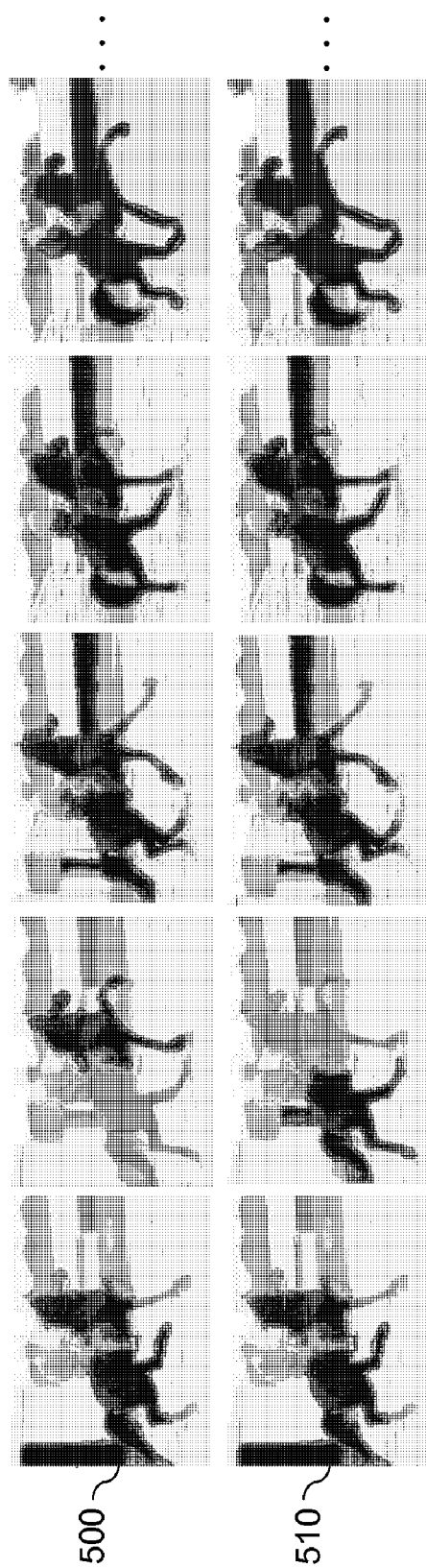
FIG. 5 illustrates a pair of replicated short-term region tracks.

To accommodate inaccurate segmentation (where a region from the frame at time t may be separated into several regions at time t+1, or several regions from time t may be merged at time t+1, we use a replication method to keep all the possible region tracks as illustrated by the example shown in FIG. 5. In this example, the horse is separated into 2 parts in the second frame due to inaccurate segmentation. To handle this case, two short term region tracks 335 are formed: a first replicate 500 containing the first half of the horse, and a second replicate 510 containing the second half of the horse. Such an approach not only retains all possible short-term region tracks to provide rich information for constructing short-term audiovisual atom-based codebooks, but also helps to reduce the noise from inaccurate segmentation. By treating the short-term region track 335 as a whole unit, the influence of wrong segments from the few video frames 215 can be reduced by averaging across good segments as majorities.

It should be noted that the STR-PTRS algorithm may miss some region tracks that enter into the screen in the middle of a short-term video slice. However, such regions will still be found in the next video slice as long as they stay in the screen long enough. For those regions that enter and exit the screen very fast (e.g., within a video slice), they are negligible in most generic videos for the purpose of semantic concept detection. Similarly, if a shot transition happens within a video slice, most region tracks during the transition will generally be discarded, and the final detection performance will hardly be affected. The STR-PTRS can be extended by adding a backward checking process to overcome this problem.

To select the appropriate length for short-term video slices, two aspects should be considered. The short-term video slice needs to be short so that a good amount of point tracking trajectories can be found to get region tracks. In general, short-term video slices 210 having a 1 second length give a balanced choice. However, in some cases, it may be desirable to use slices that are 10 second long or longer.

The extract region visual features step 340 (FIG. 3) is used to generate visual feature representations for the short-term region tracks 335 and store the visual feature representations in visual feature vectors 235 ($f_{vis}$). First, several types of visual features are extracted from each region $r_k^t$. In the preferred embodiment of the present invention, the visual featured include color moments in the HSV space (9 dimensions), Gabor texture parameters (48 dimensions), and an edge direction histogram (73 dimensions). These visual features have been found to be effective in detecting generic concepts. These features are concatenated into a 130-dim visual feature vector $\bar{f}_{vis}^t$ for each frame, and then averaged across video frames $t=1, \ldots, T$ to obtain a 130-dim visual feature vector 235 ($f_{vis}$) corresponding to the particular short-term region track 335. The visual feature vector 235 describes the overall visual characteristics of the short-term region track 335.

The extract region motion features step 350 is used to form a motion feature vector 240 for each short-term region track 335. To accomplish this, optical flow vectors are calculated over every pixel of each video frame 215 ($I^t$). In the preferred embodiment of the present invention, this is done using the Lucas-Kanade method described in the article "An iterative image registration technique with an application to stereo vision" by B. D. Lucas, et al. (Proc. Imaging understanding workshop, pp. 121-130, 1981). With this approach, a motion vector $[m1(x1^t, x2^t), m2(x1^t, x2^t)]$ is obtained for each pixel $(x1^t, x2^t)$. Then, for each region $r_k^t$, a 4-dim feature motion feature vector $\bar{f}_{mt}^t$ is computed, where each of 4 bins corresponds to a quadrant in the 2-D motion space, and the value for each bin is the average speed of motion vectors moving along directions in this quadrant. For example, the first item in $\bar{e}_{mt}^t$ is computed as:

$$\frac{1}{R} \sum_{(x1^t, x2^t) \in r^t; m1(x1^t, x2^t) > 0, m2(x1^t, x2^t) > 0} \sqrt{m1^2(x1^t, x2^t) + m2^2(x1^t, x2^t)}$$

where R is the total size of region $r^t$. The motion feature vectors for each frame are then average across $t=1, \ldots, T$ to obtain a motion feature vector 240 ($f_{mt}$) for the region. The motion feature vector 240 describes the overall moving speed and direction of the short-term region track 335. The coarse 4-bin granularity is empirically chosen for the purpose of semantic concept detection. Using too fine of a granularity for the motion directions can be very noisy. It has been found that using coarse description of motion speed and direction generally gives relatively robust performance.

Note that other types of visual features can also be extracted to describe short-term region tracks. For example, local descriptors like the Shift Invariant Feature Transform (SIFT) described by D. Lowe in the article "Distinctive image features from scale-invariant keypoints," (International Journal of Computer Vision, Vol. 60, pp. 91-110, 2004) and the Histograms of Ordered Gradients (HOG) described by N. Dalai, et al. in the article "Histograms of oriented gradients for human detection" (Proc. IEEE Conference Computer Vision and Pattern Recognition, pp. 886-893, 2005) can be used in addition to, or in place of, the visual features that have been previously described.

As mentioned previously, in the preferred embodiment of the present invention, the extract audio features step 360 forms an audio feature vector 245 based on a Matching Pursuit (MP) representation of the audio data described in the aforementioned article "Matching pursuits with time-frequency dictionaries." This is done over each short-term window corresponding to the short-term video slice. The bases used for the MP representation are Gabor functions, which are Gaussian-windowed sinusoids. The Gabor function is evaluated at a range of frequencies covering the available spectrum, scaled in length (trading time resolution for frequency resolution), and translated in time. The created functions form a dictionary, which possesses a continuum of time-frequency localization properties. The length scaling creates long functions with narrowband frequency resolution, and short functions (well-localized in time) with wideband frequency resolution. This amounts to a modular Short-Time Fourier Transform (STFT) representation, with analysis windows of variable length. During MP analysis, functions are selected in a greedy fashion to maximize the energy removed from the signal at each iteration, resulting in a sparse representation. In the preferred embodiment of the present invention, the Matching Pursuit Toolkit available from the University of Rennes in Rennes, France is used to perform the MP analysis. The dictionary contains functions at eight length scales, incremented by powers of two. For data sampled at 16 kHz, this corresponds to durations ranging from 2 to 256 ms. These are each translated in increments of one eighth of the function length, over the duration of the signal.

To ensure coverage of the audio activity in each short-term window, a fixed number of functions (e.g., 500) are extracted from each window. This set of functions is then pruned with post-processing based on psychoacoustic masking principles. This emulates the perceptual effect by which lower energy functions close in frequency to higher-energy signal cannot be detected by human hearing. In the preferred embodiment of the present invention, 70% of the functions with the highest perceptual prominence relative to their local time-frequency neighborhood are retained. This emphasizes the most salient functions, and removes less noticeable ones.

From this representation, histograms are calculated over the center frequency parameters of the functions extracted from each short-term window. A separate histogram is constructed for each of the eight function scales (durations) in the dictionary. The frequency axis is divided logarithmically into constant-Q frequency bins, one-third of an octave wide, giving 19 bins in total; each scale uses the same frequency bins. These divisions are perceptually motivated, to imitate the frequency resolution of human hearing. Since the histogram does not retain information about the relative amplitude of the functions, the mean energy of functions in each frequency bin is added to the feature set.

Compared to conventional features like Mel-Frequency Cepstral Coefficients (MFCCs), these new features are relatively invariant to background noise and to variations in acoustic channel characteristic, due to the focus on energy peaks, and the normalization implicit in forming the histogram, respectively. The histogram also provides a natural domain for segmenting the representation into portions associated with distinct objects.

Using this method, a 152-dim audio feature vector 245 ($f_{audio}$) is extracted from each short-term window corresponding to the video slice for visual tracking. Using the combine feature vectors step 370, the audio feature vector 245 is combined (by concatenation) with each short-term visual atom 355 (comprised of a visual feature vector 235 and a motion feature vector 240) in the short-term video slice 210 to generate a plurality of short-term audio-visual atoms 230. Such short-term audio-visual atoms 230 provide candidate elementary data units to characterize salient audio-visual patterns for describing individual semantic concepts.

Figure 6:
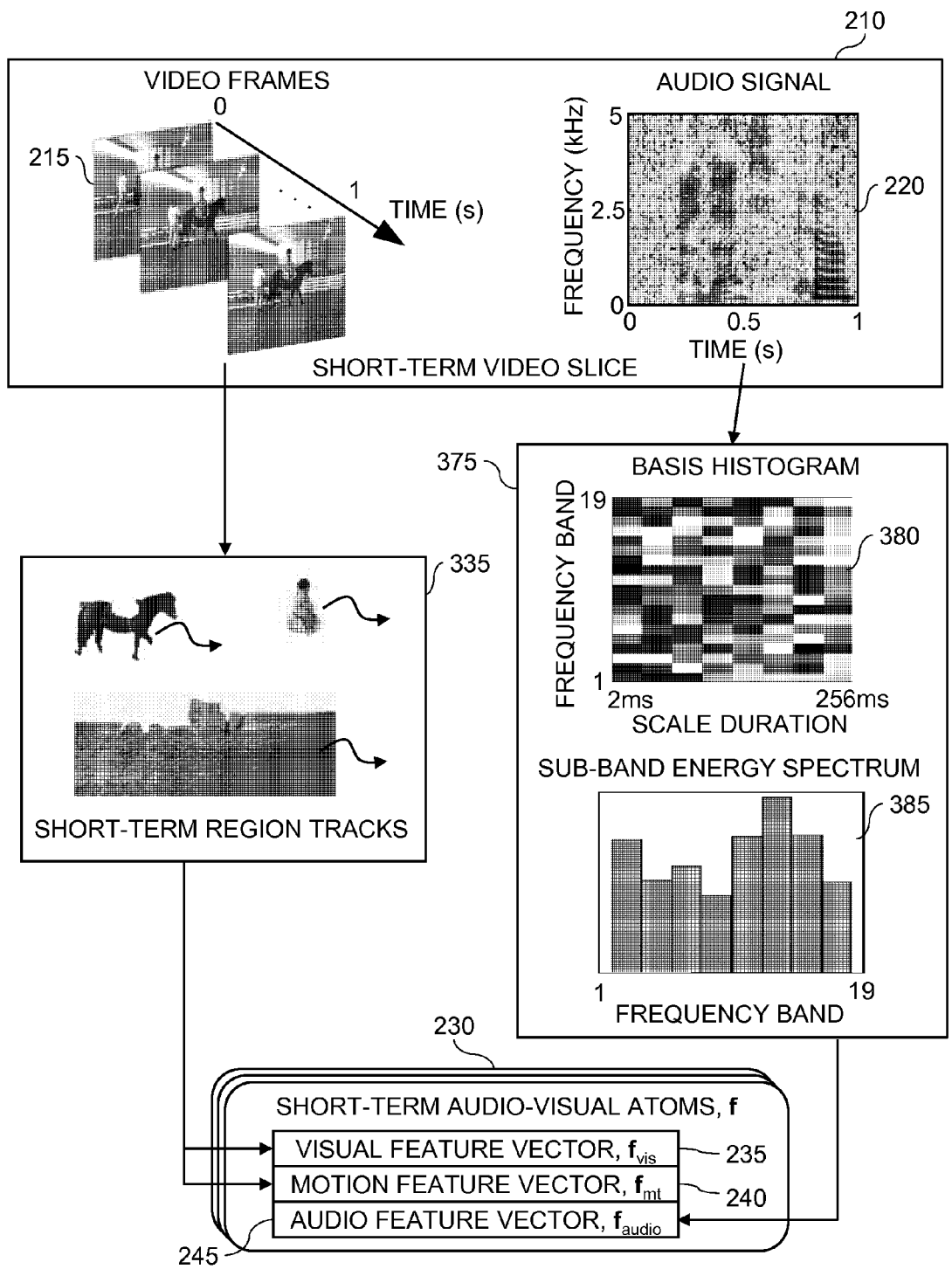
FIG. 6 shows an example of creating short-term audio-visual atoms according to an embodiment of the present invention.

FIG. 6 illustrates an example of creating short-term audio-visual atoms 230 from a short-term video slice 210 of a person riding a horse. The short-term video slice 210 is made up of a series of video frames 215 spanning a 1 second time interval and an audio signal 220. The video frames are sampled from the original video segment 200 (FIG. 2) at 0.1 second intervals. The audio signal is fundamentally an audio waveform, although it is shown here for illustration as a time-varying frequency spectrum. Using the methods described earlier, the video frames 215 are processed to form a set of short-term region tracks 335. In this example, three short-term region tracks 335 are illustrated corresponding to the horse, the rider and the ground.

The audio signal 220 is processed using the methods described earlier to form audio descriptors 375. The audio descriptors 375 include a basis histogram 380 and a sub-band energy spectrum 385.

The short term region tracks 335 are used to form visual feature vectors 235 and motion feature vectors 240 as described above. Likewise, an audio feature vector 245 is formed from the basis histogram 380 and the sub-band energy spectrum 385. The visual feature vectors 235 and corresponding motion feature vectors 240 are then combined (concatenated) with the audio feature vector 245 to form a set of short-term audio-visual atoms 230.

Figure 7:
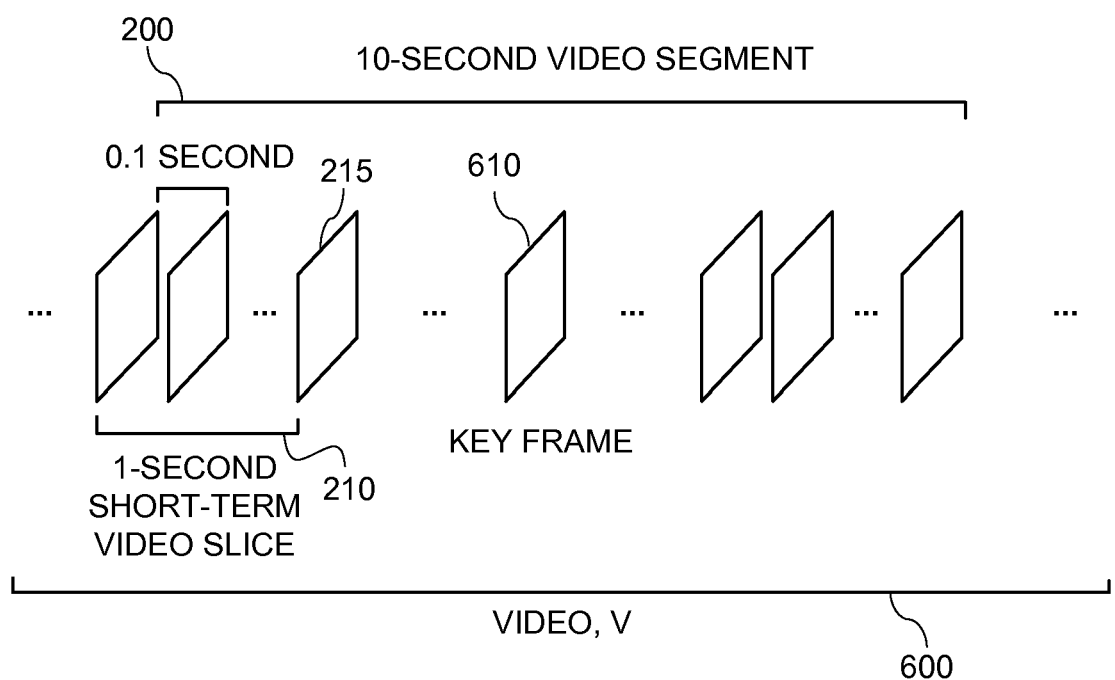
FIG. 7 illustrates breaking a video into video segments and short-term video slices.

As described in FIG. 7, a video classification (concept detection) task usually has the following formulation. First, a video 600 is divided into 10 second long video segments 200 ($u_l$), where l is the segment index. A key frame 610 ($\tilde{I}_l$) is sampled from each video segment 200. The video segments 200 are further divided to form 1 second long short-term video slices 210 comprised of a sequence of video frames 215 sampled at 0.1 second intervals. Based on this structure, short-term audio-visual atoms 230 are extracted as described earlier with reference to FIG. 3.

The video segment classifier 250 (FIG. 2) is used to assign a binary label ($y_l^k$=1 or −1) to each key frame 610 to indicate the occurrence or absence of a concept $C^k$ in the video segment 200 centered at the key frame 610, where k is the concept number. To enable this, the short-term audio-visual atoms 230 are used to construct a discriminative joint audio-visual codebook for each concept $C^k$.

Each 10-second video segment 200 has an associated "bag-of-short-term audio-visual atoms," where each short-term audio-visual atom 230 formed according to the previously described process is an instance in the bag. For a particular semantic concept $C^k$, it can be assumed that a "positive" bag (with $y_l^k$=1) must have at least one of its instances being "positive," i.e., a positive video segment for concept "animal" must have at least one short-term audio-visual atom with a "positive" indication for the "animal" concept. On the other hand, a "negative" bag ul (with $y_l^k$=−1) does not have any short-term audio-visual atoms with a "positive" indication for the "animal" concept. This formulation is known as Multiple Instance Learning (MIL) in the literature. (For example, see the aforementioned article "Image categorization by learning and reasoning with regions" by Y. Chen, et al.)

With different concatenations of $f_{vis}$, $f_{mt}$ and $f_{audio}$, various multi-modal features can be generated to describe a short-term audio-visual atom. It will be assumed that there is a combined d-dim feature space. For each concept $C^k$, we repeat an MIL-type procedure $P_k$ times in order to obtain $P_k$ discriminative prototypes ($f_p^{k*}$, $w_p^{k*}$), p=1, ..., $P_k$, consisting of a prototype point (or centroid) $f_p^{k*} = [\{f_{p1}^{k*}, \ldots, f_{pd}^{k*}\}]^T$ in the d-dim feature space, and the corresponding weights for each dimension $w_p^{k*} = [\{w_{p1}^{k*}, \ldots, w_{pd}^{k*}\}]^T$.

Among the flavors of MIL objective functions, the Diverse Density (DD) type fits the objectives well and has an efficient inference algorithm available via expectation-maximization (EM). (See the aforementioned article "Image categorization by learning and reasoning with regions," by Y. Chen, et al.) In the following equations, the subscripts k and p will be omitted without loss of generality, as each f* will be independently optimized for different concepts over different video segment bags $l \in \{1, \ldots L\}$ and different instances $j \in \{1, \ldots N_1\}$ in each bag $u_1$. The DD objective function for one bag $u_1$ is simply written as:

$$Q_1 = \frac{1+y_1}{2} - y_1 \prod_{j=1}^{N_1} (1 - \exp[-\|f_{1j} - f^*\|_{w^*}^2]) \quad (1)$$

where $f_{1j}$ is the feature vector of the $j^{th}$ short-term audio-visual atom instance with short-term region track $r_{1j}$, and $\|f\|_w$ is the weighted 2-norm of vector f by w, i.e., $\|f\|_w = (\Sigma_{i=1}^{d}(f_i w_i)^2)^{1/2}$. For a positive bag $u_1$, $Q_1$ will be close to 1 when $f^*$ is close to any of its instances, and $Q_1$ will be small when $f^*$ is far from all its instances. For a negative bag $u_1$, $Q_1$ will be large when $f^*$ is far from all its instances. By aggregating Eq. (1) over all bags the optimal $f^*$ will be close to instances in the positive bags and far from all of the instances in the negative bags. For each positive video segment bag $u_1$, there should be at least one short-term audio-visual atom 230 to be treated as a positive sample to carry the label of that bag. This instance, denoted by $L(u_1)$, is identified as the closest instance to the prototype $f^*$ and is given by:

$$L(u_1) = \arg\max_{j=1}^{N_1} \{\exp[-\|f_{1j} - f^*\|_{w^*}^2]\} \quad (2)$$

For each negative bag $u_1$ (with $y_1 = -1$), on the other hand, all instances are treated as negative samples, whose contributions to $Q_1$ are all preserved.

This leads to the max-ed version of Eq. (1) on positive bags:

$$Q_1 = \begin{cases} \exp[-\|f_{1L(u_1)} - f^*\|_{w^*}^2], & y_1 = 1 \\ \prod_{j=1}^{N_1} (1 - \exp[-\|f_{1j} - f^*\|_{w^*}^2]), & y_1 = -1 \end{cases} \quad (3)$$

The DD function in Eq. (3) is used to construct an objective function Q over all bags, $Q = \Pi_{u_1} Q_1$. Q is maximized by an EM algorithm.

We use each instance in each positive bag to repeatedly initiate the DD-optimization process above, and prototypes with DD values smaller than a threshold $H_{ad}$ (that equals to the mean of DD values of all learned prototypes) are excluded. Such prototype learning process is conducted for each semantic concept independently, and the final learned prototypes form a codebook to describe the discriminative characteristics of each individual concept.

In practice, since the number of negative bags is usually much larger than that of positive bags, we maintain a balanced number of positive and negative bags for prototype learning by sampling the negative ones. Specifically, the negative bags that come from the same videos as positive bags are all used, and at least one negative bag is randomly selected from the remaining videos.

For each semantic concept $C^k$, the learned prototypes form a codebook to describe its discriminative characteristics, each prototype corresponding to a codeword. These codewords span a codebook-based feature space to represent short-term audio-visual atoms 230. For a short-term audio-visual atom 230 with a short-term region track 335 (r) and a feature vector f, it can be mapped to each prototype codeword $(f_p^{k*}, w_p^{k*})$ by the weighted norm-2 distance $$\|f - f_p^{k*}\|_{w_p^{k*}}^2$$

Accordingly, each 10-sec video segment 200 (u) can be mapped to each prototype codeword by using the minimum distance:

$$D(u, f_p^{k*})_{w_p^{k*}} = \min_{r_j \in u} \{\|f_j - f_p^{k*}\|_{w_p^{k*}}^2\}. \quad (4)$$

Then the video segment 200 (u) can be represented by a codebook-based feature:

$$D^k(u) = \left[D(u, f_1^{k*})_{w_1^{k*}}, \ldots, D(u, f_{p_k}^{k*})_{w_{p_k}^{k*}}\right]^T, \quad (5)$$

on which classifiers, such as the well-known SVMs, can be trained for concept detection in accordance with the present invention.

By using different combinations of $f_{vis}$, $f_{mt}$, $f_{audio}$, various codebooks can be generated in different multi-modal feature spaces. In general, different types of codebooks have uneven advantages for detecting different concepts. The optimal types of codebooks to use are selectively chosen by adopting a boosting feature selection framework. The Real AdaBoost method described by J. Friedman, et al. in the article "Additive logistic regression: a statistical view of boosting" (Annals of Statistics, Vol. 28, pp. 337-407, 2000) is used, where during each iteration, an optimal codebook is selected to construct an SVM classifier as the weak learner, and the final detector is generated by adding up weak learners from multiple iterations. FIG. 8 summarizes a concept detector construction algorithm 700 for use in accordance with the present invention. The concept detector construction algorithm 700 constructs concept detectors by selectively using different codebooks. It has been empirically determined that 10 iterations works well for many implementations.

Once the SVM classifiers have been trained, they can be used by the video segment classifier 250 (FIG. 2) to operate on a set of short-term audio-visual atoms 230 that have been formed for a particular video segment 200 to determine corresponding video segment classifications 255 for that video segment 200. Given an unclassified video segment 200 (u), the trained SVM classifiers are applied to generate a set of concept detection scores, $p(C^1|u), \ldots, p(C^K|u)$. Each concept detection score $p(C^k|u)$ gives the probability of the occurrence of concept $C^k$ in the video segment 200. When the concept detection score for a particular concept exceeds a defined threshold, the video segment 200 can be classified as containing that concept.

In a preferred embodiment of the present invention, the following steps are used to compute the concept detection scores $p(C^k|u)$. First, the video segment 200 (u) is broken into a plurality of short-term video slices 210 ($v_1, \ldots, v_m$). Second, a set of $N_i$ short-term audio-visual atoms 203 ($f_{i1}, \ldots, f_{iN_i}$) are determined from each short-term video slice 210 ($v_i$) by using the process described with reference to FIG. 3. Third, a codebook-based feature $D^k(u)$ is determined for the video segment 200 using Eq. (5). Fourth, the SVM classifier trained for concept $C^k$ is applied to this codebook-based feature to generate $p(C^k|u)$. It should be noted that the video segment 200 can have any arbitrary duration greater than or equal to the duration of the short-term video slices 210 (with the upper bound of the entire length of video), and does not necessarily have to have the same length as the video segments used in the training process.

The method of the present invention was evaluated against two state-of-the-art static-region-based image categorization approaches that also use multiple instance learning using a consumer video data set from real users. In particular, the present invention was compared with the DD-SVM algorithm described by Y. Chen, et al. in the article "Image categorization by learning and reasoning with regions" (Journal of Machine Learning Research, Vol. 5, pp. 913-939, 2004) and the ASVM-MIL algorithm described by C. Yang, et al., in the article "Region-based image annotation using asymmetrical support vector machine-based multiple-instance learning" (Proc. IEEE Conference Computer Vision and Pattern Recognition, pp. 2057-2063, 2006). For the DD-SVM algorithm, visual codebooks are constructed by MIL based on static regions and codebook-based features are generated for SVM classification. For the ASVM-MIL algorithm, asymmetrical SVM classifiers are directly built using static regions under the MIL setting. Experiments demonstrated that more than 120% gain in the mean average precision (on a relative basis) was achieved compared to both DD-SVM and ASVM-MIL. In addition, the performance using both audio and visual features, outperformed the use of visual features alone by an average of 8.5% over 21 classifications, with many classifications achieving more than 20% improvement.

A computer program product for practicing the method according to the present invention can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store an executable computer program having instructions for controlling one or more computers.

The invention has been described in detail with particular reference to certain preferred embodiments thereof, but it will be understood that variations and modifications can be effected within the spirit and scope of the invention.

PARTS LIST

110 Data processing system
120 Peripheral system
130 User interface system
140 Data storage system
200 Video segment
205 Form short-term video slices step
210 Short-term video slices
215 Video frames
220 Audio signal
225 Form short-term audio-visual atoms step
230 Short-term audio-visual atoms
235 Visual feature vector
240 Motion feature vector
245 Audio feature vector
250 Video segment classifier
255 Video segment classification
310 Extract point tracks step
315 Point tracks
320 Extract regions step
325 Regions
330 Form short-term region tracks step
335 Short-term region tracks
340 Extract region visual features step
350 Extract region motion features step
355 Short-term visual atoms
360 Extract audio features step
370 Combine feature vectors step
375 Audio descriptors
380 Basis Histogram
385 Sub-band energy spectrum
400 Region track algorithm
500 First replicate
510 Second replicate
600 Video
610 Key frame
700 Concept detector construction algorithm

The invention claimed is:

1. A method for determining a classification for a video segment, comprising using a processor to perform the steps of:
   a) breaking the video segment into a plurality of short-term video slices, each including a plurality of video frames and an audio signal;
   b) analyzing the video frames for each short-term video slice to form a plurality of region tracks, wherein the region tracks provide an indication of the position of identified image regions in a plurality of video frames;
   c) analyzing each region track to form a corresponding visual feature vector providing an indication of visual features for the image region, and a motion feature vector providing an indication of inter-frame motion for the image region;
   d) analyzing the audio signal for each short-term video slice to determine an audio feature vector providing a characterization of the audio signal;
   e) forming a plurality of short-term audio-visual atoms for each short-term video slice by combining the visual feature vector and the motion feature vector for a particular region track with the corresponding audio feature vector; and
   f) using a classifier to determine a classification for the video segment responsive to the short-term audio-visual atoms.

2. The method of claim 1 wherein the short-term video slices correspond to a specified time interval, and wherein the specified time interval is less than or equal to the duration of the video segment.

3. The method of claim 1 wherein step b) includes:
   i) extracting a plurality of point tracks from the short-term video slice;
   ii) extracting a plurality of regions from the short-term video slice; and
   iii) combining the extracted point tracks and the extracted regions to form a plurality of region tracks.

4. The method of claim 1 wherein the visual feature vector includes color moment elements, texture feature descriptor elements or edge direction histogram elements.

5. The method of claim 1 wherein the motion feature vector includes elements providing a representation of the speed and direction of motion for the region track.

6. The method of claim 1 wherein the audio feature vector includes elements providing a time-frequency representation of the energy in the audio signal.

7. The method of claim 1 wherein step f) includes computing weighted norm-2 distances between the short-term audio-visual atoms and a plurality of prototype audio-visual atoms to determine a closest prototype audio-visual atom.

8. The method of claim 1 wherein the classifier is a support vector machine classifier.

9. The method of claim 1 wherein the classifier is trained by determining short-term audio-visual atoms for a training set of video segments, where the training set of video segments have known classifications.

10. The method of claim 1 wherein the classifier is trained using a multiple instance learning algorithm.

11. A method for determining a representation of a video segment, comprising using a processor to perform the steps of:
- a) breaking the video segment into a plurality of short-term video slices, each including a plurality of video frames and an audio signal;
- b) analyzing the video frames for each short-term video slice to form a plurality of region tracks, wherein the region tracks provide an indication of the inter-frame motion for image regions that occur in a plurality of video frames;
- c) analyzing each region track to form a corresponding visual feature vector and a motion feature vector;
- d) analyzing the audio signal for each short-term video slice to determine an audio feature vector;
- e) forming a plurality of short-term audio-visual atoms for each short-term video slice by combining the visual feature vector and the motion feature vector for a particular region track with the corresponding audio feature vector; and
- f) combining the short-term audio-visual atoms to form a representation of the video segment.

12. A system comprising:
a data processing system; and
a memory system communicatively connected to the data processing system and storing instructions configured to cause the data processing system to implement a method for determining a classification for a video segment, wherein the instructions comprise:
- a) breaking the video segment into a plurality of short-term video slices, each including a plurality of video frames and an audio signal;
- b) analyzing the video frames for each short-term video slice to form a plurality of region tracks, wherein the region tracks provide an indication of the position of identified image regions in a plurality of video frames;
- c) analyzing each region track to form a corresponding visual feature vector providing an indication of visual features for the image region, and a motion feature vector providing an indication of inter-frame motion for the image region;
- d) analyzing the audio signal for each short-term video slice to determine an audio feature vector providing a characterization of the audio signal;
- e) forming a plurality of short-term audio-visual atoms for each short-term video slice by combining the visual feature vector and the motion feature vector for a particular region track with the corresponding audio feature vector; and
- f) using a classifier to determine a classification for the video segment responsive to the short-term audio-visual atoms.

\* \* \* \* \*

UNITED STATES PATENT AND TRADEMARK OFFICE
CERTIFICATE OF CORRECTION

PATENT NO. : 8,135,221 B2
APPLICATION NO. : 12/574716
DATED : March 13, 2012
INVENTOR(S) : Wei Jiang et al.

It is certified that error appears in the above-identified patent and that said Letters Patent is hereby corrected as shown below:

| Issued Patent | | Description of Error |
|---|---|---|
| Column | Line | |
| 1 | 7 | Please delete "commonly assigned," |
| 1 | 10 | Please delete "commonly assigned," |

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 8,135,221 B2 | |
| APPLICATION NO. | : 12/574716 | |
| DATED | : March 13, 2012 | |
| INVENTOR(S) | : Wei Jiang et al. | |

It is certified that error appears in the above-identified patent and that said Letters Patent is hereby corrected as shown below:

| Issued Patent | | Description of Error |
|---|---|---|
| Column | Line | |
| 1 | 14 | Before FIELD OF THE INVENTION, please insert: |

--STATEMENT REGARDING FEDERALLY-SPONSORED RESEARCH OR DEVELOPMENT

This invention was made with government support under grants CNS0716203 and CNS0751078 awarded by the NSF. The Government has certain rights in the invention.--

Signed and Sealed this
Twenty-ninth Day of May, 2012

David J. Kappos
*Director of the United States Patent and Trademark Office*